United States Patent [19]

Buddemeyer et al.

[11] 4,310,561
[45] * Jan. 12, 1982

[54] PROTEIN-FREE SYNTHETIC MILK OR THE LIKE

[75] Inventors: Bruce D. Buddemeyer; William A. Neville; Richard G. Bourne, all of Kansas City, Mo.

[73] Assignee: R.G.B. Laboratories, Inc., Kansas City, Mo.

[ * ] Notice: The portion of the term of this patent subsequent to Dec. 30, 1997, has been disclaimed.

[21] Appl. No.: 132,188

[22] Filed: Mar. 20, 1980

[51] Int. Cl.³ .................. A23D 5/00; A23C 11/00
[52] U.S. Cl. .................... 426/601; 426/602; 426/613
[58] Field of Search ............. 426/103, 564, 570, 602, 426/613, 658, 601

[56] References Cited

U.S. PATENT DOCUMENTS

| | | | |
|---|---|---|---|
| 3,514,298 | 5/1970 | Noznick et al. | 426/613 X |
| 3,533,802 | 10/1970 | Cooper et al. | 426/602 X |
| 3,806,605 | 4/1974 | Patterson | 426/564 |
| 3,903,310 | 9/1975 | Buide et al. | 426/602 X |
| 3,924,018 | 12/1975 | Sims et al. | 426/564 |
| 3,958,033 | 5/1976 | Sims et al. | 426/602 |
| 4,242,364 | 12/1980 | Buddemeyer et al. | 426/98 |

FOREIGN PATENT DOCUMENTS 688859  6/1964  Canada ................... 426/613

Primary Examiner—Robert A. Yoncoskie
Attorney, Agent, or Firm—Schmidt, Johnson, Hovey & Williams

[57] ABSTRACT

Protein-free, preferably non-dairy, emulsified food products such as low or non-sugar synthetic milk and creams are provided which exhibit desirable organoleptic properties virtually identical with or even exceeding those of the corresponding dairy products and have excellent storage and freeze-thaw characteristics. The products hereof can be in liquid, frozen or dried form and include a base which consists essentially of respective amounts of non-sweet, water soluble, carbohydrates having a D.E. of from about 10 to 70, fat in particulate form, and an emulsifier for maintaining the carbohydrate and fat is a stable aqueous dispersion. Stability of the products of the invention is achieved without the presence of protein or large amounts of sugar as has heretofore been thought necessary, so that the products can be used in lieu of traditional relatively non-sweet dairy products by persons having an intolerance to milk protein, for example. Further optional features can also be employed in the products hereof, e.g., nutritional additives, flavoring and coloring agents, pH modifiers, buffers, sweeteners and stabilizers.

18 Claims, No Drawings

PROTEIN-FREE SYNTHETIC MILK OR THE LIKE

BACKGROUND OF THE INVENTION

This invention relates to completely protein-free food products such as synthetic milks and creams which simulate to a high degree their natural counterparts, but which are more stable over extended periods of storage and repeated freeze-thaw cycles. More particularly, the invention is concerned with products which can be used in lieu of traditional milks and creams and the like by persons having an intolerance to milk protein or sugar, for example.

Substitute food products such as synthetic milks and creams have been proposed in the past. In certain cases these products have achieved substantial commercial success. The products are used by those who, for health reasons, cannot tolerate certain types of dairy products, or in instances where religious convictions restrict the consumption of dairy products.

In order to be successful, synthetic milks, creams and the like must have a number of characteristics. First and foremost, the ersatz products must exhibit taste, appearance, handling and mouth feel properties which are identical or at least closely similar to their traditional dairy counterparts. In addition, these products must be stable for relatively long periods (e.g., at least three weeks and preferably longer) in order to make centralized production and distribution thereof feasible. In the same connection, these products must be able to withstand one or more freeze-thaw cycles and still retain their stability and organoleptic properties. This requirement stems from the fact that grocery stores and other distribution centers will oftentimes store the products under conditions where they will become frozen, either inadvertently or by design. Hence, without substantial freeze-thaw stability, substitute milks, creams and the like could well be impractical.

In most instances emulsified synthetic milks and creams include an amount of protein such as sodium caseinate. The functional purpose of protein in such formulations is to render the emulsion stable. In fact, it has heretofore been thought that acceptable substitute milks and creams could not be produced without using protein or a functional equivalent thereof.

DESCRIPTION OF THE PRIOR ART

U.S. Pat. No. 3,958,033 to Sims et al. describes shelf stable emulsions which are protein free. However, these emulsions without exception contain a substantial fraction of sugar, and it is postulated that the use of relatively large quantities of sugar enhances the stability of the resultant emulsions. However, it will be readily recognized that emulsions of this type cannot be used in conjunction with synthetic milks and creams, since large quantities of sugar would render the resultant products unacceptably sweet.

U.S. Pat. Nos. 2,786,765 to Prince and 3,806,605 to Patterson describe topping formulations which are protein free. In both cases however, substantial quantities of sugar are employed, which is objectionable in synthetic milks and creams for the reasons described above. Moreover, the Patterson patent describes the use of a cellulose emulsion stabilizer such as hydroxypropyl cellulose. This component is believed to function as a substitute for protein.

SUMMARY OF THE INVENTION

It is therefore the most important object of the present invention to provide protein-free food products such as synthetic milks or creams which are virtually identical with traditional dairy product counterparts in terms of taste, appearance, mouth feel and other organoleptic properties, and which exhibit substantial shelf life and freeze-thaw stability making them eminently suited for commercial manufacture and distribution.

As a corollary to the foregoing, another object of the invention is to provide protein-free, non-dairy products usable in lieu of traditional dairy items such as milks and creams and which include a base, with the base consisting essentially of (wherein all percentages are computed using the total weight of the base as 100%) from about 22 to 96.7% by weight of a relatively non-sweet, water soluble, carbohydrate material (preferably starch derived) having a D.E. (Dextrose Equivalent) of from about 10 to 70, from about 3 to 70% by weight of fat in particle form, and from about 0.3 to 16% by weight of an emulsifier for maintaining the carbohydrate material and fat in a stable dispersion when the base is dispersed in an aqueous medium; the protein-free nature of the products renders them hypoallergenic, while the lack of significant sugar content (although minor amounts of sugar may be used for taste purposes) allows the products to be used directly as milks and creams, for example.

Another aim of the invention is to provide protein-free products of the type described wherein the fat content thereof is in particulate form, with a substantial portion of the fat particles having a diameter of no greater than about 3 microns, and preferably of no greater than about 1 micron, in order to preclude coalescing of the fat particles in the product with resultant instability of the oil-in-water emulsions.

In its broadest aspects, the present invention is concerned with protein-free products which have a wide variety of uses in lieu of or in combination with traditional dairy products. For example, synthetic milks and coffee creamers can be produced in accordance with the present invention which are completely stable and organoleptically desirable notwithstanding the elimination of protein in the formulation. As noted above, this makes the products hereof suitable for use by those individuals suffering from protein related allergies or the like. Moreover, the absence of protein renders the resultant compositions acid stable and avoids taste problems inherent in products which employ soy protein or the like.

Preferably, the products hereof include a base which consists essentially of (all percentages being computed using the total weight of the base taken as 100%) from about 22 to 96.7% by weight of a relatively non-sweet, water soluble, carbohydrate material having a D.E. of from about 10 to 70, and more preferably a carbohydrate material level of from about 30 to 84% by weight. Starch-derived carbohydrates are preferred, but other types of carbohydrates could be used. The base also includes from about 3 to 70% by weight of fat in particulate form (more preferably from about 13 to 60% by weight), with a substantial portion of the fat particles having a diameter of no greater than about 3 microns, and more preferably no greater than about 1 micron. Finally, the base includes from about 0.3 to 16% by weight of an emulsifier or emulsifier system in order to maintain the carbohydrate material and fat in a stable emulsion (more preferably from about 1 to 9%) when the base is dispersed in an aqueous medium. The products hereof can be in dried, dilutable concentrate, frozen or liquid form, depending upon the desired end use; in all cases however, the product includes a base having the characteristics described above.

DESCRIPTION OF THE PREFERRED EMBODIMENTS

In more detail, the relatively non-sweet, water soluble, carbohydrate material is preferably selected from the group consisting of corn syrup, wheat syrup, sorghum syrup or their malto-dextrins and mixtures thereof having a D.E. of from about 10 to 70. Most preferably however, the carbohydrate material is selected from the group consisting of corn syrups and malto-dextrins having a D.E. of from about 15 to 50. Such materials have the desirable properties of being essentially non-sweet while also giving excellent body and mouth feel to the ultimate non-dairy products. In this connection, the preferred carbohydrate materials are broadly classified as being "water soluble"; however, it is to be understood that this term is to be taken in the broad sense, as opposed to a narrow, technical definition of solubility. That is to say, as long as the carbohydrate materials are capable of being suspended in a substantially uniform and homogeneous fashion in an aqueous medium, they meet the dictates of the present invention.

The fat portion of the products of the present invention is, as noted, in particulate form for the purpose of preventing agglomeration of the fat and resultant emulsion breakdown. In preferred forms, the fat is selected from the group consisting of animal, vegetable, marine or synthetic fats. Most preferably, the fat should be selected from the group consisting of cottonseed, soy, corn, peanut, safflower, sunflower, olive, rapeseed, coconut, palm kernel, palm, cocoa butter, sesame, sorghum, babassu, lard, tallow, butterfat, whale, herring, menhaden, pilchard, sardine, halibut, and synthetic mono, di and triglycerides and mixtures thereof. The specific fat chosen for use in the invention should be such that a substantial portion of the fat particles created during processing have a diameter of no greater than about 3 microns, and preferably no greater than about 1 micron. In practice, it has been found advantageous to ensure that at least about 85% by weight of the fat particles are of the relatively small diameters listed.

A wide variety of emulsifiers can be used to good effect in the present invention, and the particular levels of use in connection with each type or class of emulsifiers can be readily determined. Broadly, a selected emulsifier or emulsifier system should be capable of maintaining the carbohydrate and fat components of the base in a stable dispersion, when the base is dispersed in an aqueous medium. In most cases when the base is dispersed in water, the emulsifier should be capable of forming stable oil-in-water emulsions. In particular, the emulsifier is preferably selected from the group consisting of: stearyl-n-lactylic acids, where n ranges from about 1 to 5, and the sodium, potassium and calcium salts thereof, succinylated mono- and diglycerides of edible $C_{12}$–$C_{24}$ fatty acids and the sodium and potassium salts thereof, diacetyl tartaric acid esters of mono- and diglycerides of $C_{12}$–$C_{24}$ edible fatty acids, and the sodium and potassium salts thereof, polyglycerol esters of $C_{12}$–$C_{24}$ edible fatty acids, ranging from 3 to 10 glycerol units and one to ten fatty acids per molecule, polyoxyethylene (20) sorbitan mono-, di- and triesters of $C_{12}$–$C_{24}$ edible fatty acids, ethoxylated mono- and diglycerides of edible $C_{12}$–$C_{24}$ fatty acids, stearyl monoglyceridyl citrate, and the sodium and potassium salts thereof, citric acid esters of mono- and diglycerides of edible $C_{12}$–$C_{24}$ fatty acids, and the sodium and potassium salts thereof, propylene glycol mono- and diesters of edible $C_{12}$–$C_{24}$ fatty acids, glycerol mono- and diesters of edible $C_{12}$–$C_{24}$ fatty acids, lactylated propylene glycol and glycerol mono- and diesters of edible $C_{12}$–$C_{24}$ fatty acids, acetylated propylene glycol and glycerol mono- and diesters of edible $C_{12}$–$C_{24}$ fatty acids, sorbitan monostearate, lecithin, sucrose esters of edible $C_{12}$–$C_{24}$ fatty acids, phosphated mono- and diglycerides of edible $C_{12}$–$C_{24}$ fatty acids, and mixtures thereof. Most preferably, the emulsifier is anionic and is selected from the group consisting of sodium stearyl-2-lactylate, succinylated mono- and diglycerides of edible $C_{12}$–$C_{24}$ fatty acids, diacetyl tartaric acid esters of mono- and diglycerides of $C_{12}$–$C_{24}$ fatty acid esters in their acid or salt form, and mixtures thereof. Specific commercially available emulsifiers usable in the invention hereof include:

diacetyl tartaric acid esters of mono-diglycerides: Panodan, Grinsted Products, Inc.

hexaglycerol distearate: Drewpol 6-2-S, P.V.O. International, Inc.

distilled succinylated monoglycerides: Myverol SMG, Eastman Chemical Products, Inc.

distilled monoglyceride: Myverol 18-06, Eastman Chemical Products, Inc.

stearyl-2-lactylic acid: SLA, C. J. Patterson Company or Marvic Acid, Glidden-Durkee, division of SCM Corporation mono-diglycerides of fatty acids, 52% alpha mono: Aldo HMSK, Glyco Chemicals, Inc.

triglycerol monostearate: Drewpol 3-1-S, P.V.O. International, Inc.

stearyl monoglyceridyl citrate: Batter-lite Corporation diacetyl tartaric acid esters of mono-diglycerides, potassium salt: potassium salt of Panodan, Grinsted Products, Inc.

distilled propylene glycol monostearate: Promodan, Grinsted Products, Inc. or Myverol P-06, Eastman Chemical Products, Inc.

tetraglycerol monostearate: Poly Aldo 4-1-S, Glyco Chemicals, Inc.

distilled succinylated monoglyceride, potassium salt: potassium salt of Myverol SMG-V, Eastman Chemical Products, Inc.

distilled monoglyceride derived from hydrogenated cottonseed oil (92% alpha mono): Myverol 18-07, Eastman Chemical Products, Inc.

polysorbate 60: Tween 60, ICI America, Inc.

distilled propylene glycol mono-ester of stearic acid and palmitic acid: Myverol P-06, Eastman Chemical Products, Inc.

ethoxylated monoglycerides: Aldosperse MS-20, Glyco Chemicals, Inc.

distilled glycerol monostearate derived from hydrogenated soybean oil: Myverol 18-06, Eastman Chemical Products, Inc.

sodium stearyl fumarate: Pruv, Chas. Pfizer Company succinylated monoglycerides: Myverol SMG, Eastman Chemical Products, Inc.

distilled monoglycerides derived from hydrogenated soybean oil (92% alpha mono minimum): Myverol 18-06, Eastman Chemical Products, Inc.

distilled succinylated monoglycerides from palm oil, hydrogenated: Myverol SMG-V, Eastman Chemical Products, Inc.

distilled monoglycerides from hydrogenated palm oil: Myverol 18-04, Eastman Chemical Products, Inc.

propylene glycol monostearate: Aldo PME, Glyco Chemicals, Inc.

citric acid esters of monoglycerides: Acidan, Grinsted, Products, Inc.

sodium stearyl-2-lactylate: Emplex, C. J. Patterson Company lactylated mono-diglycerides: Durlac 100 WK, Glidden-Durkee division of SCM Corporation ethoxylated mono-diglyceride: Santelle EOM(K), Glidden-Durkee division of SCM Corporation diacetyl tartaric acid esters of monodiglycerides, sodium salt: sodium salt of Panodan, Grinsted Products, Inc.

distilled monoglycerides derived from tallow (92% alpha mono): Myverol 18-00, Eastman Chemical Products, Inc.

potassium stearyl-2-lactylate: potassium salt of Stearyl-2-Lactylic Acid, C. J. Patterson Company lactylated glycerol and propylene glycol esters of fatty acids: Durlac 300 K, Glidden-Durkee division of SCM Corporation distilled succinylated monoglycerides from vegetable origin: Myverol SMG-V, Eastman Chemical Products, Inc.

distilled monoglycerides from vegetable origin: Myverol 18-98, Eastman Chemical Products, Inc.

In many forms of the present invention, it is necessary or desirable to add optional ingredients for imparting desired organoleptic or nutritional properties to the product. Such agents are well known to those skilled in the art and may include those selected from the group consisting of vitamins, minerals, flavoring agents, sweeteners (e.g., sucrose or other sugars), coloring agents, salt, pH adjustment agents, buffers, stabilizers, essential amino acids, anti-caking agents, anti-foaming agents, and mixtures thereof. Again, these optional ingredients can be used in minor amounts as needed for creating desirable properties in the end products.

As noted above, the products of the present invention can take any one of a number of physical forms such as a substantially dry, free-flowing powder which can be reconstituted by dispersion in water or other aqueous medium, as a dilutable concentrate, in frozen form, or as a directly usable liquid. Broadly, the liquid forms of the present invention should include from about 35 to 95% by weight of water, based upon the total weight of the liquid product taken as 100%, and with the base dispersed within the water. In the case of a particularly preferred synthetic milk in accordance with the invention, the product would have from about 72 to 92% by weight water, and most preferably from about 82 to 90% by weight water. In such a milk product the base would consist essentially of (all percentages computed using the total weight of the base taken as 100%) from about 36 to 96.7% by weight of a carbohydrate material of the class described, from about 3 to 46% by weight of fat, and from about 0.3 to 16% by weight of an emulsifier. Most preferably, this base would consist essentially of from about 54 to 84% by weight carbohydrate material, from about 13 to 39% by weight fat, and from about 1.5 to 9% by weight emulsifier.

As dilutable concentrates, the products of the present invention should include from about 35 to 70% by weight water, with the base again being dispersed in the water. The dilutable concentrate form can be, for example, a synthetic cream or a product sold to institutions rather than to the retail market.

Directly usable cream substitutes should preferably comprise from about 50 to 90% by weight water, and more preferably from about 65 to 80% by weight water, with the base being dispersed within the water. The base for a substitute cream should advantageously contain (all percentages computed using the total weight of the base taken as 100%) from about 22 to 87% by weight carbohydrate (more preferably from about 30 to 64%), from about 12 to 70% by weight of particulate fat (most preferably from about 28 to 60%), and from about 0.4 to 8% by weight of a selected emulsifier or group thereof (most preferably from about 1 to 4%).

In order to be successful, the products of the invention must be stable in aqueous emulsion. As used in the present specification and claims, a dried, liquid fat-containing non-dairy food product is said to be "stable" when the following minimum criteria are met:

A. Reconstituted Emulsion Stability

In this test a 25% by volume aqueous dispersion of the product is made by dispersing the appropriate quantity of the dried product in water. A one quart sample of this dispersion is then refrigerated at 40° F. for a period of 72 hours in a glass container. At the end of this period fat separation is measured according to the following index, and an index number is assigned to each five percent increment of fat separated. In order to meet this test, the product must score at least an 8.

| Index Number | Percent Oil Separation |
| --- | --- |
| 10 | 0 |
| 9+ | 5 |
| 9 | 10 |
| 8+ | 15 |
| 8 | 20 |
| 7+ | 25 |
| 7 | 30 |
| 6+ | 35 |
| 6 | 40 |
| 5+ | 45 |
| 5 | 50 |
| 4 | Emulsion Broken |

B. Whitening Capability

An amount of the dried composition sufficient to provide about 0.36 grams of fat is added and stirred into 50 mls. of freshly brewed black coffee (175° F.) in the sample cup of an Agtron Model M-500A, reflectometer. This unit is standardized in the red spectral mode, 640 m.u., with a 00 calibration disc for zero and a 44 calibration disc for 100% relative reflectance, thereby giving an expanded scale for measurement. The reflectance of the sample is measured using the calibrated reflectometer, and to be acceptable a relative spectral reflectance of at least 50% must be achieved.

In addition to the foregoing tests A and B, the following criteria are also advantageous especially in connection with a coffee whitening product; however, meeting standards C and D is not an absolute prerequisite for "stability" in accordance with the invention; particularly with respect to synthetic milks and the like.

C. Oiling or Oil Separation

In this test three grams of the dried composition is added to 150 mls. of 175° F. black coffee in a 200 ml. Pyrex tallform beaker. The mixture is then gently stirred and allowed to stand for two minutes. At the end of this period, the surface of the mixture is examined, and any oil droplets on the 5 cm. diameter surface are counted. The rating is as follows:

| Rating | No. of Droplets |
|---|---|
| 10 | None |
| 9 | 1-5 |
| 8 | 6-10 |
| 7 | 11-15 |
| 6 | 16-20 |
| 5 | Over 20 |

To be acceptable, the product must achieve a rating of at least 8.

D. Feathering—Precipitation

After counting the oil droplets as described in test C, the coffee-product mixture is allowed to stand for a further 3 minutes. The mixture is first examined for precipitation, and if any precipitation or flocculation is observed, the product is unsatisfactory. At the same time, feathering is measured according to the following scale:

| Rating | Degree of Feathering |
|---|---|
| 10 | Total absence of feathering |
| 9 | Slight amount of feathering |
| 8 | Moderate amount of feathering |
| 7 | Heavy feathering |

To be acceptable, a product must have a rating of at least 8 (no precipitation and moderate feathering).

The products of the present invention are preferably formulated as a liquid. Although any one of a number of various processing techniques can be employed, it is important that the fat component be broken down into relatively small particles and a stable emulsion formed. In this connection, considerable success has been achieved in laboratory experiments through the use of a laboratory sized Case emulsifier. Such a unit includes a stainless steel, conical vessel having therein a series of superposed, perforated plates, with the perforations in respective plates being out of alignment with those of adjacent plates. The unit also includes a recirculation line for taking liquid from the bottom of the vessel back to the top thereof, and a positive displacement pump is interposed in the recirculation line for relatively high pressure recirculation of liquid material. During processing, the liquid components are recirculated through the emulsification apparatus and are subjected to vigorous agitation and shear. In addition, direct steam addition is provided for further agitation and heating of the liquid product during recirculation thereof.

In the use of the Case laboratory emulsifier, the starch-derived carbohydrate material and water are first admixed and run through the Case emulsifier to ensure complete dispersion thereof. Sweetening and coloring agents, if used, may also be added during this initial sequence. Steam injection is generally initiated following this initial step in order to heat the liquid product to a desired level, whereupon the fat and emulsifiers are added to the blend. Additional recirculative mixing in the Case emulsifier (referred to as "hold time") then follows with additional heating by virtue of steam injection. Finally, other optional products such as salt and flavoring agents are added, with a final hold time period to ensure complete dispersion of the solids within the water. The products are then preferably homogenized in a conventional Gaulin two-stage homogenizer using, for example, 3500 p.s.i. first stage and 500 p.s.i. second stage.

The above described method was used to make a variety of synthetic milk and cream products in accordance with the invention. The details of the respective products so produced, and the test results achieved in connection with the same, are recorded in the following Examples. It is to be understood however, that the Examples are presented for purposes of illustration only, and are not intended to limit the present invention.

EXAMPLE 1

TABLE I

LIQUID HYPOALLERGENIC SYNTHETIC MILK

| [1]Processing Temperature °F. | [2]Hold Time (min.) | Ingredients | % by Weight |
|---|---|---|---|
| 90 | | Deionized water | 84.7129 |
| | | 80% solids corn syrup, 36 D.E., (A. E. Staley Mfg. Co.) | 11.0000 |
| | | Sucrose | .2500 |
| 110 | 3 | F.D. & C. yellow color, Warner-Jenkinson Company) | .0001 |
| 140 | | Soybean oil (P/S ratio = 2.9) | 3.5000 |
| | | Diacetyl tartaric acid esters of mono-diglycerides (Grinsted Products, Inc.) | .1500 |
| | | Hexaglycerol distearate (PVO International, Inc.) | .1500 |
| 150 | | Distilled succinylated monoglycerides, (Eastman Chemical Products) | .1000 |
| | 2 | Distilled monoglyceride of fatty acids (90% alpha mono) (Eastman Chemical Products) | .0600 |
| 160 | | Potassium chloride | .0570 |
| 170 | 1 | Artificial milk flavor #2089 (David Michael & Co., Inc.) | .0200 |
| | | | 100.0000 |

[1]Refers to the temperature of the mixture in the vessel at the time of addition of the ingredients.
[2]Refers to the hold time, with agitation, after ingredient(s) added.

A stainless steel mixing vessel of the type described above was employed. The vessel was equipped with an agitator and had a conical lower section. The vessel also included a lower outlet coupled to recirculation conduit and pump for recirculating liquid from the bottom of the vessel back to the top thereof. The piping from the vessel pump also included a diversion valve to convey the final product to a conventional two-stage Gaulin homogenizer, and then on to a chilled water (38° F.) plate and/or surface chiller. The vessel was also equipped with a steam injection unit for directly heating and agitating the product during processing.

Following the particular order of ingredients listed in Table I, the corn syrup, sucrose and color were combined with 90° F. deionized water in the stainless steel mixing vessel with continuous vigorous agitation. Following complete dispersion of these ingredients, steam injection was initiated. At 110° F. the food coloring was added, and mixing was continued for about 3 minutes. When the mixture reached about 140° F., the fat and emulsifiers were added to the blend, with 2 minutes additional mixing (hold time on Table I), and steam injection heating were continued. The three-component emulsifier system was added at 150° F., potassium chloride salt was added at 160° F., and finally the flavoring at 170° F. Vigorous agitation was continued one final minute, and the pH of the product was adjusted to 6.5–6.9 by using a minor amount of dipotassium phosphate. The mixture was immediately homogenized at 3500 psi. first stage; 500 psi second stage, through the Gaulin two-stage homogenizer followed by cooling to 40° F. The homogenized mixture was then packaged in quart cartons and placed in a 40° F. refrigerated room. Another sampling of the batch (3–4 quarts) was rapidly frozen in a −10° F. freezer.

To determine emulsion stability, 800 mls. of the 40° F. liquid product was transferred to a one-liter separatory funnel and supported in the refrigerated area for observation as to fat separation, and fat assays of the samples were removed from the top and bottom of the funnel following 7 days storage time. Fat assays revealed a fat percentage of 4.6–4.8 in the top layer and 3.0–3.4 at the bottom. The pH of the final product was 6.7.

Organoleptically, the appearance of the product was, in all respects, virtually identical to milk. It exhibited an excellent bland taste devoid of off-flavors; and the odor, mouth feel and pouring characteristics thereof were substantially the same as whole cow's milk.

The frozen quarts were subjected to five freeze-thaw cycles whereby the product was frozen to −10° F., and then thawed to 45°–50° F. On examination of the finally thawed product at 40° F., it exhibited the same physical and chemical properties as the liquid product described above.

EXAMPLE 2

TABLE II

| NON-DAIRY MILK-CONCENTRATE | | | |
|---|---|---|---|
| Temperature °F. | Hold Time (Min.) | Ingredients | % by Weight |
| 85 | | Water | 55.6220 |
| | | Corn syrup solids 19 D.E. (Anheuser-Busch, Inc.) | 30.0000 |
| 110 | 1 | Sorbitol | 1.0000 |
| 145 | | Beta-carotene | .0020 |
| | | Corn oil (P/S ratio = 5.1) CPC International, Inc. | 11.6660 |
| | | Stearyl-2-lactylic acid | .4000 |
| 150 | | Mono-diglycerides of fatty acids, 52% alpha mono (Aldo HMSK, Glyco Chemicals, Inc.) | .2100 |
| | | Triglycerol monostearate Drewpol 3-1-S, (PVO International, Inc.) | .4800 |
| 160 | 2 | Stearyl monoglyceridyl citrate (Batter-lite Corporation) | .2200 |
| | | Sodium chloride | .9099 |
| | | Dipotassium phosphate | .2300 |
| 175 | 1 | Artificial milk flavor (Grinsted Products, | |

TABLE II-continued

| NON-DAIRY MILK-CONCENTRATE | | | |
|---|---|---|---|
| Temperature °F. | Hold Time (Min.) | Ingredients | % by Weight |
| | | Inc.) | .0800 |
| | | | 100.0000 |

A non-dairy milk concentrate was prepared with substantially the same technique as described in Example 1. Vigorous agitation was employed throughout the make-up process. The food grade components are listed in the particular order of addition.

The final mixture was homogenized at 3000–500 psi, first and second stages, respectively, and immediately cooled to 40° F. and spray dried.

This and all other spray drying experiments described herein were performed using an Anhydro Laboratory Spray Dryer Size No. 1, (Anhydro, Inc., 165 John L. Dietsch Square, Attleboro Falls, Mass. 02763). The dryer was equipped with a ¼ inch JSS 190 4 dual (product-air) nozzle for upward vertical air atomization. The spray dryer was also equipped with a Bosch motor driven centrifugal atomizer CD-63 with atomizer wheel spaced at 0.6 mm. and capable of rotation at speeds from 0 to 50,000 R.P.M. This dryer has the evaporation capacity of approximately 5.5 Kg/hr. at an inlet temperature of 250° C., outlet temperature 90° C.

The spray dryer was readied according to the manufacturer's instructions and the electrical power, fan and heating elements were actuated. The air pressure to the dual nozzle was adjusted to 15 lbs./sq. in. The dryer was adjusted to heat the incoming filtered air to approximately 200° C., and water flow from the feed bowl to the nozzle was adjusted to maintain an outlet temperature of 90° C. The temperatures were allowed to equilibrate, water flow was stopped, and the concentrate product was pumped to the nozzle. Rate of flow through the nozzle was then adjusted to maintain an outlet temperature of 88°–93° C. The dryer was allowed to operate with conditions unchanged until one liter of the emulsion concentrate had been dried. Yield of dried product was approximately 300 grams.

The above resultant spray dried material was analyzed with the following results:

Moisture: 0.64%
Fat: 27.43%
pH (10% H$_2$O): 6.77
Dispersability in H$_2$O: Good 0.5% by weight Syloid 244 silica gel was added to the dried product, and this was reconstituted to an aqueous solution by adding, with stirring, 1 part of powder to 5.5 parts of room temperature tap water. The resultant non-dairy fluid milk was cooled to 40° F. and organoleptically evaluated. The chilled product exhibited a bland milk-like flavor, no odor, good mouth feel, and generally had the appearance and handling characteristics of homogenized whole milk. After refrigeration (40° F.) for 7 days, the product still appeared homogeneous and presented the same properties as did the initially reconstituted product.

In the following examples 3–9, inclusive, illustrative synthetic protein-free milks are described using various types of carbohydrates, fats and emulsifiers. In each example the method of Example 1 was followed, and the respective ingredients were added in the order listed. All synthetic milks, unless indicated otherwise, were homogenized at 3500 psi, first stage, 500 psi, second stage. Separate quantities of the milk substitute were refrigerated at 40° F. and frozen at −10° F. All products closely simulated whole cow's milk in terms of organoleptic properties and other physical characteristics, and all had excellent freeze-thaw stability.

EXAMPLE 3
TABLE III

| Temperature °F. | Hold Time (Min.) | Ingredients | % by Weight |
|---|---|---|---|
| 70 | | Water | 84.9520 |
| 95 | 2 | Corn syrup 60 D.E. | 10.5000 |
| 140 | 1 | Coconut fat 92° F.M.P. | 4.0000 |
| | | Diacetyl tartaric acid esters of mono-diglycerides, potassium salt | .1500 |
| | | Triglycerol monostearate | .1800 |
| | | Distilled propylene glycol monostearate | .0400 |
| 150 | 2 | Ethoxylated mono-diglycerides | .1000 |
| | | Potassium chloride | .0530 |
| 175 | 1 | Artificial milk flavor | .0250 |
| | | | 100.0000 |

Organoleptic examination of the refrigerated product revealed an excellent, rich, bland flavor, excellent mouth feel, and generally a product resembling whole cow's milk. pH was measured to be 6.9. The product was examined during a three week period and was found to be stable and palatable in all respects. Color, flavor, and mouth feel were not different from the fresh product. Examination of the product as a whitening agent in freshly brewed black coffee revealed whitening power comparable to whole milk, with less oiling and feathering as compared with dairy milk.

EXAMPLE 4
TABLE IV

| Temperature °F. | Hold Time (Min.) | Ingredients | % by Weight |
|---|---|---|---|
| 90 | | Water | 82.8900 |
| | | Corn syrup 10 D.E. | 11.0000 |
| | 1 | Sugar | .2500 |
| | | Calcium hydroxide | .2220 |
| | | Magnesium hydroxide | .0310 |
| | 1 | Dipotassium phosphate | .7050 |
| | | Citric acid anhydrous | .3800 |
| 100 | 1 | F.D. & C. yellow color | .0130 |
| 140 | 1 | Soybean oil (P/S ratio = 3.1) | 4.0000 |
| | | Diacetyl tartaric acid esters of mono-glycerides | .1500 |
| | | Hexaglycerol distearate | .1500 |
| | | Succinylated monoglycerides | .1000 |
| 160 | 2 | Distilled monoglycerides derived from hydrogenated soybean oil (92% alpha mono min.) | .0600 |
| 170 | 1 | Artificial milk flavor | .0490 |
| | | | 100.0000 |

The pH of the product was measured at 7.0. The product was subjected to seven freeze-thaw cycles and found to be stable. This formulation was found to approach optimum formulation and processing contitions in that all of the desirable characteristics of fresh whole milk were achieved, in addition to freeze-thaw stability.

Quart samples were taken of this product, and a sampling of 800 ml. thereof was placed in a one-liter separatory funnel and refrigerated for examination over a four week period. Following two weeks, 20 ml. of the product was removed from the top and bottom of the funnel and analyzed for fat percentage using the standard Babcock method. The sampling from the top on duplicate analysis averaged 4.05 and the bottom fraction averaged 3.0. The pH was measured to be 6.9.

The liquid product was frozen, thawed to 45° F., and refrozen to −10° F. through five cycles without any apparent change in the physical characteristics of the product.

EXAMPLE 5
TABLE V

| Temperature °F. | Hold Time (Min.) | Ingredients | % by Weight |
|---|---|---|---|
| 80 | | Water | 83.3330 |
| | 1 | Wheat syrup 30 D.E. | 11.0000 |
| | | Sugar | .2500 |
| | | Calcium hydroxide | .2220 |
| | | Magnesium hydroxide | .0310 |
| | | Dipotassium phosphate | .7050 |
| | 1 | Citric acid anhydrous | .3800 |
| 85 | 1 | F.D. & C. yellow color | .0130 |
| 140 | | Corn oil (P/S ratio = 5.0) | 3.5000 |
| | | Diacetyl tartaric acid esters of monoglycerides | .1500 |
| | | Hexaglycerol distearate | .1500 |
| | | Distilled succinylated monoglycerides from palm oil hydrogenated | .1050 |
| 160 | 2 | Distilled monoglycerides from hydrogenated palm oil | .0550 |
| | | Potassium chloride | .0570 |
| 175 | 1 | Artificial milk flavor | .0490 |
| | | | 100.0000 |

EXAMPLE 6
TABLE VI

| Temperature °F. | Hold Time (Min.) | Ingredients | % by Weight |
|---|---|---|---|
| 90 | | Water | 84.8030 |
| | 1 | Waxy maize corn syrup 24 D.E. | 11.0000 |
| | | Fructose | .2500 |
| | | Calcium hydroxide | .2220 |
| | 1 | Magnesium hydroxide | .0310 |
| | | Dipotassium phosphate | .7050 |
| | 1 | Citric acid anhydrous | .3800 |
| 95 | | F.D. & C. yellow color | .0130 |
| | | Guar gum | .0200 |
| 145 | 1 | Sesame oil (P/S ratio = 3.1) | 2.0000 |
| | | Diacetyl tartaric acid esters of mono & diglycerides | .1500 |
| | | Triglycerol monostearate | .1800 |
| | | Propylene glycol monostearate | .0400 |
| 164 | 2 | Citric acid esters of monoglycerides | .1000 |
| | | Potassium chloride | .0570 |

TABLE VI-continued

| Temperature °F. | Hold Time (Min.) | Ingredients | % by Weight |
|---|---|---|---|
| 175 | 1 | Artificial milk flavor | .0490 |
| | | | 100.0000 |

Several quarts of the product resulting from the above described were examined after 14 days of refrigeration and found to be substantially equivalent to fresh whole milk with good mouth feel, flavor, taste, pouring characteristics, and no indication of emulsion breakdown. The pH was found to be 7.1.

EXAMPLE 7
TABLE VII

| Temperature °F. | Hold Time (Min.) | Ingredients | % by Weight |
|---|---|---|---|
| 75 | | Water | 83.283767 |
| | | Corn syrup 24 D.E. | 11.000000 |
| | 1 | High fructose corn syrup 120 D.E. | .250000 |
| | | Calcium hydroxide | .222000 |
| | 1 | Magnesium hydroxide | .031000 |
| | | Dipotassium phosphate | .705000 |
| | 1 | Citric acid anhydrous | .380000 |
| | | Electrolytic iron | .000146 |
| | | Zinc oxide | .000455 |
| 80 | | F.D. & C. yellow color | .013000 |
| 140 | 1 | Soybean oil (P/S ratio = 3.1) | 3.500000 |
| | | Diacetyl tartaric acid esters of mono-diglycerides | .100000 |
| | | Distilled succinylated monoglycerides | .100000 |
| | | Sodium stearyl-2-lactylate | .100000 |
| | | Hexaglycerol distearate | .100000 |
| 160 | 1 | Triglycerol monostearate | .100000 |
| | | Potassium chloride | .057000 |
| 175 | 1 | Artificial milk flavor | .049000 |

This product was immediately cooled to 38° F., and the following nutritional fortifications was intimately added thereto using a high shear mixer:

TABLE VII (Continued)

| Temperature °F. | Hold Time (Min.) | Ingredients | % by Weight |
|---|---|---|---|
| 38 | | Vitamin A palmitate | .000956 |
| | | Ascorbic Acid | .004781 |
| | | Thiamine mononitrate | .000038 |
| | | Riboflavin | .000186 |
| | | Niacinamide | .000164 |
| | | Vitamin D-2 | .000478 |
| | | Pyrodoxine hydrochloride | .000064 |
| | | Vitamin B$_{12}$ (0.1%) | .000539 |
| | | Pantothenic acid | .001039 |
| 40 | 2 | Folic acid (1%) | .000387 |
| | | | 100.000000 |

The pH of this fortified synthetic milk was measured at 6.8, and freeze-thaw stability was excellent. The product exhibited all of the attributes of whole milk, i.e., general appearance, color, mouth feel, correct residual mouth feel and aftertaste.

EXAMPLE 8
TABLE VIII

| Temperature °F. | Hold Time (Min.) | Ingredients | % by Weight |
|---|---|---|---|
| 80 | | Water | 83.0930 |
| | | Sorghum syrup 30 D.E. | 11.0000 |
| | | Mannitol | .2500 |
| | 1 | Calcium hydroxide | .2220 |
| | | Magnesium hydroxide | .0310 |
| | 1 | Dipotassium phosphate | .7050 |
| 90 | 1 | Citric acid | .3800 |
| | | F.D. & C. yellow color | .0130 |
| 140 | 1 | Sunflower oil (P/S ratio = 5.8) | 3.5000 |
| | | Diacetyl tartaric acid esters of monoglycerides | .3500 |
| 160 | 2 | Distilled succinylated monoglycerides | .3500 |
| | | Potassium chloride | .0570 |
| 170 | 1 | Artificial milk flavor | .0490 |
| | | | 100.0000 |
| 80 | | Water | 83.0930 |
| | | Sorghum syrup 30 D.E. | 11.0000 |
| | | Mannitol | .2500 |
| | 1 | Calcium hydroxide | .2220 |
| | | Magnesium hydroxide | .0310 |
| | 1 | Dipotassium phosphate | .7050 |
| 90 | 1 | Citric acid | .3800 |
| | | F.D. & C. yellow color | .0130 |
| 140 | 1 | Sunflower oil (P/S ratio = 5.8) | 3.5000 |
| | | Diacetyl tartaric acid esters of monoglycerides | .3500 |
| 160 | 2 | Distilled succinylated monoglycerides | .3500 |
| | | Potassium chloride | .0570 |
| 170 | 1 | Artificial milk flavor | .0490 |
| | | | 100.0000 |

EXAMPLE 9
TABLE IX

| Temperature °F. | Hold Time (Min.) | Ingredients | % by Weight |
|---|---|---|---|
| 90 | | Water | 84.9650 |
| | | Corn syrup 36 D.E. | 11.0000 |
| | | Sucrose | .2500 |
| 110 | 2 | Beta-carotene | .0020 |
| 140 | 1 | Soybean oil (P/S ratio = 3.2) | 3.3000 |
| | | Diacetyl tartaric acid esters of mono-diglycerides | .2000 |
| | | Tetraglycerol monostearate | .1000 |
| | | Polysorbate 80 | .0200 |
| 150 | 1 | Distilled monoglyceride derived from hydrogenated palm oil, (92% alpha min.) | .0500 |
| | | Distilled succinylated monoglyceride, potassium salt | .0500 |
| | | Potassium chloride | .0450 |
| 170 | 1 | Artificial milk flavor | .0180 |
| | | | 100.0000 |

In each of the following Examples (10–19) coffee cream substitutes were prepared. The method was identical to that used in preparing the liquid synthetic milk of Examples 1–9, and the same shear-agitation device was used. Moreover, the ingredients were combined in the order stated in the respective tables, and hold times and temperatures were as stated. Following homogenization, (3500 psi first stage, 500 psi second stage), the products were cooled to 38° F. in a surface cooler and store at 40° F. and/or frozen at −10° F. for analysis.

EXAMPLE 10

TABLE X

PROTEINLESS NON-DAIRY CREAMER

| Temperature °F. | Hold Time (Min.) | Ingredients | % by Weight |
|---|---|---|---|
| 90 | | Water | 72.9046 |
| | | Corn syrup 24 D.E. | 12.0000 |
| 110 | 3 | Dextrose | .8500 |
| 140 | | Cottonseed oil (P/S ratio = 2.5) | 12.0000 |
| | | Sodium stearyl-2-lactylate | .2100 |
| | | Distilled monoglyceride derived from hydrogenated cottonseed oil (92% alpha mono) | .3800 |
| | | Polysorbate 60 | .2330 |
| 160 | 2 | Distilled propylene glycol mono-esters of stearic acid and palmitic acid | .0800 |
| | | Annatto color | .0020 |
| | | Dipotassium phosphate | 1.3400 |
| 175 | 1 | Butter flavor | .0004 |
| | | | 100.0000 |

Examination of the resultant cream substitute product of this Example revealed a homogeneous creamy liquid resembling light table cream. The pH was measured as 7.35. It exhibited a bland creamy taste and excellent mouth feel. On addition to 175° F. freshly brewed black coffee, its whitening capability was excellent, no oiling was evident, and upon standing fifteen minutes, feathering was quite minimal.

As a further demonstration of emulsion stability, 800 mls of the 40° F. product was transferred to a one-liter bottle and refrigerated for daily observation as to emulsion stability, fat separation, precipitation, and wheying. Separate frozen quart samples were subjected to freeze-thaw cycles whereby the product was frozen to −10° F. and then thawed to 45°–50° F., then refrozen and rethawed repeatedly until the product separated.

The product exhibited excellent refrigerated stability for three weeks at which time the evaluation was terminated. The product also withstood twelve freeze-thaw cycles prior to evidence of separation.

EXAMPLE 11

TABLE XI

PROTEINLESS NON-DAIRY CREAMER

| Temperature °F. | Hold Time (Min.) | Ingredients | % by Weight |
|---|---|---|---|
| 75 | | Water | 49.1068 |
| | | Corn Syrup 36 D.E. | 32.5400 |
| 110 | 3 | Fructose | .5500 |
| 145 | | Soybean oil (P/S ratio = 3.3) | 15.0000 |
| | | Succinylated monoglycerides | .4500 |
| | | Diacetyl tartaric acid esters of monoglycerides | .4100 |
| 155 | 3 | Ethoxylated monoglycerides | .3200 |
| | | Beta-carotene | .0024 |
| | | Artificial cream flavor | .0008 |
| 170 | 2 | Dipotassium phosphate | 1.6200 |
| | | | 100.0000 |

The creamer of this Example had the following characteristics:
Moisture: 55.42%
Fat: 15.57%
pH: 7.38

Functionality was determined by adding 8 mls of the cream substitute to 150 mls of hot black coffee. The non-protein cream whitened coffee without oiling, and feathering was very minimal. The product was stored for three weeks and was found to be equally as functional as the creamer when fresh.

EXAMPLE 12

TABLE XII

PROTEINLESS NON-DAIRY CREAMER - CONCENTRATE FOR SPRAY DRYING

| Temperature °F. | Hold Time (Min.) | Ingredients | % by Weight |
|---|---|---|---|
| 90 | | Water | 43.2900 |
| 140 | 2 | Corn syrup 35 D.E. | 36.0000 |
| | | Diacetyl tartaric acid esters of monoglycerides | .3000 |
| | | Hexaglycerol distearate | .3000 |
| | | Succinylated monoglycerides (Distilled) | .5400 |
| 155 | 1 | Distilled glycerol monostearate derived from hydrogenated soybean oil | .1200 |
| 175 | 2 | Soybean oil (P/S ratio = 3.0) | 18.0000 |
| | | Annatto color | .0400 |
| 195 | 1 | Dipotassium phosphate | 1.4100 |
| | | | 100.0000 |

The non-dairy creamer emulsion was prepared with substantially the same technique as described in Example 1, and about 7 liters of the liquid concentrate of this Example was cooled and spray dried as described in Example 2, giving a yield of about 3,000 grams.

The spray dried material was analyzed with the following results:
Moisture: 1.29%
Fat: 35.93%
pH (10% H$_2$O): 7.10
Dispersability: Good The spray dried proteinless non-dairy creamer was reconstituted (with 0.5% by weight sodium silico aluminate being added to the dried product) to an aqueous solution by addition, with stirring, one part of powder to three parts of room temperature tap water. The resultant non-dairy fluid creamer was cooled to 40° F. and organoleptically evaluated. The chilled product exhibited a bland flavor, no odor, good mouth feel, and generally has the appearance and handling characteristics of natural cream. After refrigeration (40° F.) for 7 days, the product still appeared homogeneous and presented the same properties as did the initially reconstituted product.

The dry creamer was also added directly to freshly brewed 175° F. black coffee on the basis of 2.5 grams to 100 mls. The product functioned in the same manner as fresh table cream producing a light creamy appearance with the complete absence of oiling off, and feathering was found to be less than a control prepared with fresh natural cream.

Following an accelerated dry stability study for a 30 day period whereby the product was stored in clear glass at 100° F. without benefit of an inert gas blanket, the product was found to be free-flowing and exhibited the excellent characteristics found initially.

A further experiment was conducted employing this spray dried proteinless creamer. A 25% aqueous solution was prepared with agitation and the product was homogenized at 3000-500 psi, first and second stages respectively and chilled to 40° F. The chilled product again exhibited a bland flavor without odor, good mouth feel and had the general appearance and handling characteristics of fresh cream. This product was placed in the −10° F. freezer and freeze-thaw cycles were commenced whereby the product, after being frozen solid, was thawed to 40° F., examined and refrozen. No breakdown or separation was observed following four freeze-thaw cycles, and the product exhibited excellent whitening characteristics with the absence of oiling and minimum feathering throughout the entire study.

EXAMPLE 13

TABLE XIII

PROTEINLESS NON-DAIRY CREAMER

| Temperature °F. | Hold Time (Min.) | Ingredients | % by Weight |
|---|---|---|---|
| 90 | | Water | 76.1700 |
| | 1 | Corn Syrup 36 D.E. | 11.0000 |
| | | Sugar | .5000 |
| 140 | 1 | Soybean oil (P/S ratio = 3) | 11.0000 |
| | | Beta-carotene | .0200 |
| | | Diacetyl tartaric acid esters of mono-diglycerides (Sodium salt) | .1500 |
| | | Hexaglycerol distearate | .1000 |
| | | Distilled succinylated monoglycerides | .2000 |
| 155 | 2 | Sodium stearyl fumarate | .1000 |
| | | Cream flavor (artificial) | .0550 |
| 170 | 1 | Dipotassium phosphate | .7050 |
| | | | 100.0000 |

The creamer of this Example was characterized as follows:
Moisture: 78.24%
Fat: 11.43%
pH: 7.57

Functionality of the creamer was determined by the addition of 15 ml. to 150 ml. of hot black coffee. The non-proteinaceous creamer exhibited excellent whitening ability without oiling, and feathering was very minimal. The product was stored for three weeks and following this period of time was found equally as functional as when fresh.

This creamer formulation underwent nine freeze-thaw cycles without any physical evidence of deterioration or loss of functionality.

Additional cream substitutes were prepared as described, using the following formulae Examples 14-19, inclusive). In certain cases homogenization pressures and cooling temperatures were varied slightly, as noted in Table 20 below.

EXAMPLE 14

TABLE XIV

PROTEINLESS NON-DAIRY CREAMER

| Temperature °F. | Hold Time (Min.) | Ingredients | % by Weight |
|---|---|---|---|
| 90 | | Water | 71.6866 |
| | | Corn syrup 36 D.E | 12.5000 |
| | | Xanthan | .1000 |
| 110 | 3 | Sucrose | .3500 |
| 140 | | Soybean oil (P/S ratio = 3.4) | 14.0000 |
| | | Sodium stearyl-2-lactylate | .1750 |
| | | Lactylated mono-diglycerides | .0650 |
| | | Ethoxylated mono-diglycerides | .2000 |
| 160 | 2 | Distilled succinylated monoglycerides | .2000 |
| | | Annatto color | .0020 |
| | | Dipotassium phosphate | .7210 |
| 170/ 1 | | Cream flavor | .0004 |
| | | | 100.0000 |

EXAMPLE 15

TABLE XV

PROTEINLESS NON-DAIRY CREAMER

| Temperature °F. | Hold Time (Min.) | Ingredients | % by Weight |
|---|---|---|---|
| 90 | | Water | 76.0700 |
| | 1 | Corn syrup 36 D.E. | 11.0000 |
| | | Sugar | .5000 |
| 140 | 1 | Soybean oil (P/S ratio = 3) | 11.0000 |
| | | Beta-carotene | .0200 |
| | | Diacetyl tartaric acid esters of mono-diglycerides (Sodium salt) | .1500 |
| | | Hexaglycerol distearate | .2000 |
| | | Distilled succinylated monoglycerides | .2000 |
| 155 | 2 | Distilled monoglycerides derived from tallow (92% alpha mono) | .1000 |
| | | Cream flavor (artificial) | .0550 |
| 170 | 1 | Dipotassium phosphate | .7050 |
| | | | 100.0000 |

EXAMPLE 16

TABLE XVI

PROTEINLESS NON-DAIRY CREAMER

| Temperature °F. | Hold Time (Min.) | Ingredients | % by Weight |
|---|---|---|---|
| 85 | | Water | 76.2600 |
| | 1 | Corn syrup 42 D.E. | 11.0000 |
| | | Dextrose | .5000 |
| 140 | 1 | Corn oil (P/S ratio = 5.0) | 11.0000 |
| | | Annatto color | .0200 |
| | | Diacetyl tartaric acid esters of mono and di-glycerides from hydrogenated soybean oil | .1500 |
| | | Hexaglycerol distearate | .1500 |
| | | Distilled succinylated monoglycerides from soybean oil | .1000 |

TABLE XVI-continued

PROTEINLESS NON-DAIRY CREAMER

| Temperature °F. | Hold Time (Min.) | Ingredients | % by Weight |
|---|---|---|---|
| 160 | 2 | Distilled monoglycerides, (92% alpha mono from hydrogenated soybean oil) | .0600 |
| | | Cream flavor | .0550 |
| 175 | 1 | Dipotassium phosphate | .7050 |
| | | | 100.0000 |

EXAMPLE 17

TABLE XVII

PROTEINLESS NON-DAIRY CREAMER

| Temperature °F. | Hold Time (Min.) | Ingredients | % by Weight |
|---|---|---|---|
| 70 | | Water | 75.9800 |
| 100 | 1 | Corn syrup 42 D.E. | 11.0000 |
| | | Xanthan | .1000 |
| | | Sugar | .5000 |
| 140 | 1 | Soybean oil (P/S ratio = 3.5) | 11.0000 |
| | | Potassium stearyl-2-lactylate | .1750 |
| | | Lactylated glycerol and propylene glycol esters of fatty acids | .0650 |
| | | Ethoxylated mono and diglycerides of fatty acids | .2000 |
| 160 | 2 | Distilled succinylated monoglycerides | .2000 |
| | | Cream flavor | .0550 |
| | | Beta-carotene | .0200 |
| 175 | 1 | Dipotassium phosphate | .7050 |
| | | | 100.0000 |

EXAMPLE 18

TABLE XVIII

PROTEINLESS NON-DAIRY CREAMER

| Temperature °F. | Hold Time (Min.) | Ingredients | % by Weight |
|---|---|---|---|
| 90 | | Water | 76.0850 |
| | 1 | Corn Syrup 42 D.E. | 11.0000 |
| | | Sugar | .5000 |
| 140 | 1 | Soybean oil (P/S ratio = 3.1) | 11.0000 |
| | | Beta-carotene | .0200 |
| | | Sodium stearyl-2-lactylate | .1750 |
| 165 | 2 | Distilled succinylated monoglycerides from vegetable origin | .4600 |

TABLE XVIII-continued

PROTEINLESS NON-DAIRY CREAMER

| Temperature °F. | Hold Time (Min.) | Ingredients | % by Weight |
|---|---|---|---|
| | | Cream flavor | .0550 |
| 170 | 1 | Dipotassium phosphate | .7050 |
| | | | 100.0000 |

EXAMPLE 19

TABLE XIX

PROTEINLESS NON-DAIRY CREAMER

| Temperature °F. | Hold Time (Min.) | Ingredients | % by Weight |
|---|---|---|---|
| 90 | | Water | 76.0100 |
| | 1 | Corn syrup 36 D.E. | 11.0000 |
| | | Dextrose | .5000 |
| 140 | 1 | Soybean oil (P/S ratio = 3.0) | 11.0000 |
| | | Beta-carotene | .0200 |
| | | Sodium stearyl-2-lactylate | .2500 |
| 165 | 2 | Distilled monoglycerides from vegetable origin | .4600 |
| | | Cream flavor | .0550 |
| 180 | 1 | Dipotassium phosphate | .7050 |
| | | | 100.0000 |

The creamer products of Examples 14–19, inclusive, were evaluated for refrigeration and freeze-thaw stability, whitening capability, oil-off and feathering tendencies. These results are collected in Table XX:

TABLE XX

PROTEINLESS NON-DAIRY CREAMERS - EXAMPLES 14–19

| | | Example | | | | | |
|---|---|---|---|---|---|---|---|
| | | 14 | 15 | 16 | 17 | 18 | 19 |
| Homogenization Pressure | First Stage | 3500 | 2000 | 3000 | 3500 | 35000 | 4000 |
| | Second Stage | 500 | 500 | 300 | 500 | 500 | 500 |
| Product °F. from Surface Cooler | | 41 | 38 | 38 | 40 | 39 | 37 |
| pH | | 7.5 | 7.6 | 7.6 | 7.4 | 7.8 | 7.5 |
| Refrigerated Stability Rating (21 days) | | 8+ | 9 | 8 | 9+ | 9+ | 9 |
| Freeze-Thaw Cycles | | 9+ | 9+ | 9+ | 9+ | 8 | 8 |
| Percent Fat | | 14.3 | 11.2 | 11.1 | 11.3 | 11.2 | 11.4 |
| Whitening Capability | | 9 | 10 | 9+ | 9 | 10 | 9+ |
| Oiling-Off in Coffee (175° F.) | | 10 | 10 | 9+ | 10 | 9+ | 10 |
| Feathering in Coffee (10 min. residence) | | 9 | 10 | 9+ | 10 | 9 | 9+ |

Refrigerated Stability Ratings were ascertained by placing 800 mls. of the approximately 40° F. product in a one-liter bottle and daily observing the product as to emulsion stability, fat separation and wheying. The 21-day rating was based primarily upon an index number relating to the percent of fat separation in the particular product as follows:

| Index Number | Percent Separation |
|---|---|
| 10 | 0 |
| 9+ | 5 |
| 9 | 10 |
| 8+ | 15 |
| 8 | 20 |
| 7+ | 25 |
| 7 | 30 |
| 6+ | 35 |
| 6 | 40 |
| 5+ | 45 |
| 5 | 50 |

| Index Number | Percent Separation |
|---|---|
| 4 | Emulsion Broken |

An index number of 8 or above was considered to indicate acceptable stability.

The number in the Freeze-Thaw Cycles line represents the number of cycles that a one quart portion withstood until separation or breakup was observed.

The percent fat reported was measured by the Babcock procedure routinely employed in the dairy industry.

Whitening capability ratings represent a comparison of the whitening ability of each product in black coffee as compared with fresh table cream, with an index of 10 being comparable, and 9 representing a product which was very slightly less efficient.

Oiling-off in coffee (175° F.) is an index of the oil separation occurring when the creamer product was added to freshly brewed black coffee, and is indicative of emulsion stability. The total absence of oil was rated at 10, one to five oil globules a 9, and six to ten an 8. Feathering was a subjective comparison referring to the amount or degree of whitish precipitation which collected on the surface of the coffee after a ten minute period as compared with fresh cream. A rating of 9 or above was considered quite acceptable and comparable to fresh cream.

U.S. Pat. No. 3,924,018 to Sims et al. is directed to low pH whipped toppings. In order to demonstrate that the teachings of this patent could not be used to produce products in accordance with the present invention, the following experiments were performed.

In particular, Examples Nos. 1, 4, 6 and 8 of the subject Sims et al. patent were repeated using in separate runs for each patent example, a liquid polyunsaturated soybean oil and, comparatively, a hydrogenated coconut oil. The products resulting from each of these tests were subjected to the emulsion stability, reflectance (whitening), oiling and feathering tests A, B, C, D discussed above, in order to determine if the products were acceptable.

EXAMPLE 20

| Ingredients | Grams | Percent by Weight (dry basis) |
|---|---|---|
| Water | 4457.3 | |
| Myverol SMG | 150.0 | 3.00 |
| Sodium Carbonate | 15.0 | 0.30 |
| Emargol | 12.5 | 0.25 |
| Mor-Sweet 1435 | 3015.2 | 49.45 |
| Mello Kleer | 2350.0 | 47.00 |
| | 10000.0 | 100.00 |

PROCEDURE

The Myverol SMG and sodium carbonate were dispersed in the water in a jacketed Groen kettle equipped with an agitator. The dispersion was heated to 140° F. and mixed well. The Emargol was then added, followed by the Mor-Sweet syrup, after which agitation was continued for one minute prior to the addition of the oil (Mello Kleer) which had been pre-heated to 140° F. The product was held for 5 minutes while agitation continued and then was homogenized at 1500 psi, single stage and spray dried.

Results of product evaluations for this and the preparations which follow are summarized in Table XXXVIII.

TABLE XXI

| Temperature | Hold Time | Ingredient | Grams | Percent by Weight (dry basis) |
|---|---|---|---|---|
| 140° F. | until dispersion complete | Water | 4457.3 | |
| | | Myverol SMG | 150.0 | 3.00 |
| | | Sodium Carbonate | 15.0 | 0.30 |
| | 1 minute | Emargol | 12.5 | 0.25 |
| | | Mor-Sweet 1435 | 3015.2 | 49.45 |
| 140° F. | 5 minutes | Coconut Oil | 2350.0 | 47.00 |

Example 21, as well as the formulations which follow in Examples 22–27, were prepared, homogenized and spray dried in the same manner as Example 20, order of addition being as listed. Addition temperatures and mixing hold times were as noted for each preparation.

TABLE XXII

| Temperature | Hold Time | Ingredient | Grams | Percent by Weight (dry basis) |
|---|---|---|---|---|
| 140° F. | until dispersion complete | Water | 4495.8 | |
| | | Myverol SMG | 250.0 | 5.00 |
| | | Sodium Carbonate | 25.0 | 0.50 |
| | 1 minute | Polysorbate 60 | 78.0 | 1.56 |
| | | Mor-Sweet 1435 | 1801.2 | 45.94 |
| 140° F. | 5 minutes | Coconut Oil | 2350.0 | 47.00 |

TABLE XXIII

| Temperature | Hold Time | Ingredient | Grams | Percent by Weight (dry basis) |
|---|---|---|---|---|
| 140° F. | until dispersion complete | Water | 4495.8 | |
| | | Myverol SMG | 250.0 | 5.00 |
| | | Sodium Carbonate | 25.0 | 0.50 |
| | 1 minute | Polysorbate 60 | 78.0 | 1.56 |
| | | Mor-Sweet 1435 | 2801.2 | 45.94 |
| 140° F. | 5 minutes | Mello Kleer | 2350.0 | 47.00 |

TABLE XXIV

| Temperature | Hold Time | Ingredient | Grams | Percent by Weight (dry basis) |
|---|---|---|---|---|
| 140° F. | until dispersion complete | Water | 4475.9 | |
| | | Myverol SMG | 250.0 | 5.00 |
| | | Sodium Carbonate | 25.0 | 0.50 |
| | 1 minute | Mor-Sweet 1435 | 2911.6 | 47.75 |
| 140° F. | 5 minutes | Coconut Oil | 2337.5 | 46.75 |

TABLE XXV

| Temperature | Hold Time | Ingredient | Grams | Percent by Weight (dry basis) |
|---|---|---|---|---|
| 140° F. | until dispersion complete | Water | 4475.9 | |
| | | Myverol SMG | 250.0 | 5.00 |
| | | Sodium Carbonate | 25.0 | 0.50 |
| 140° F. | 1 minute | Mor-Sweet 1435 | 2911.6 | 47.75 |
| | 5 minutes | Mello Kleer | 2337.5 | 46.75 |

TABLE XXVI

| Temperature | Hold Time | Ingredient | Grams | Percent by Weight (dry basis) |
|---|---|---|---|---|
| 140° F. | until dispersion complete | Water | 4451.2 | |
| | | Emargol | 150.0 | 3.00 |
| 140° F. | 1 minute | Mor-Sweet 1435 | 3048.8 | 50.00 |
| | 5 minutes | Coconut Oil | 2350.0 | 47.00 |

TABLE XXVII

| Temperature | Hold Time | Ingredient | Grams | Percent by Weight (dry basis) |
|---|---|---|---|---|
| 140° F. | until dispersion complete | Water | 4451.2 | |
| | | Emargol | 150.0 | 3.00 |
| 140° F. | 1 minute | Mor-Sweet 1435 | 3048.8 | 50.00 |
| | 5 minutes | Coconut Oil | 2350.0 | 47.00 |

The ingredients used in the foregoing Tables 20–27 are identified as follows:

| INGREDIENTS | |
|---|---|
| Myverl SMG: | succinylated monoglycerides |
| Emargol: | sodium sulfo-acetate ester of mono and diglycerides, 50% active |
| Mor-Sweet 1435: | high maltose corn syrup solids (43 D.E.), |
| Mello Kleer: | 82% solids polyunsaturated soybean oil, P/S ration 3:1 |
| Coconut Oil: | hydrogenated coconut oil, iodine value less than 4.0 |

TABLE XXVIII[1]

| Example No. | U.S. Pat. No. 3,924,018 Example No. | Type[2] Oil | Dry Product Percent Fat Theor. | Dry Product Percent Fat Actual | Drying[6] Characteristics | Emulsion Stability[4] | pH | Performance in Coffee[3] Whitening | Performance in Coffee[3] Oiling[5] | Performance in Coffee[3] Feathering |
|---|---|---|---|---|---|---|---|---|---|---|
| 20 | 1 | MK | 52.72 | 53.0 | 9 | 6+ | 7.35 | 9 | 5 | 10 |
| 21 | 1 | CN | 52.72 | 51.0 | 8+ | 7 | 7.50 | 8+ | 5 | 10 |
| 22 | 4 | CN | 52.27 | 50.4 | 6 | 7+ | 7.15 | 8+ | 5 | 9 |
| 23 | 4 | MK | 52.27 | 50.0 | 4 | 8 | 7.20 | 8+ | 5 | 9 |
| 24 | 6 | CN | 52.22 | | 3 | 7+ | 7.10 | 8+ | 6 | 8 |
| 25 | 6 | MK | 52.22 | 55.0 | 4 | 8 | 7.10 | 8+ | 6 | 9 |
| 26 | 8 | CN | 52.80 | 46.0 | 9 | 6 | 5.50 | 8 | 5 | 10 |
| 27 | 8 | MK | 52.80 | 46.0 | 8+ | 5 | 4.35 | 8 | 5 | 10 |

[1]In all evaluation categories, lowest score characterizing acceptable performance = "8".
[2]"MK" = Mello Kleer  "CN" = Coconut Oil
[3]0.78 grams product in 50 ml. black coffee.
[4]Score of "8" denotes 20% fat seperation.
[5]Score of "8" denotes 10 or less oil droplets.
[6]Score of "8" or above acceptable.

Examples Nos. 22–25 with coconut oil or Mello Kleer (polyunsaturated soybean oil) were found difficult to spray dry in varying degrees, as described below:

TABLE XXIX

| Example No. | Description of Product in the Spray Dryer |
|---|---|
| 22 | Oily, sticky, viscous substance |
| 23 | Viscid, oily, gummy product |
| 24 | Very gummy, oily, gooey substance |
| 25 | Viscid, oily, gummy product |

All of the products described above presented very poor yields.

It will thus be seen that the Examples of U.S. Pat. No. 3,924,018 do not yield acceptable products in terms of the present invention.

Having thus described the invention, what is claimed as new and desired to be secured by Letters Patent is:

1. A protein-free product which is a substitute for milk or cream comprising at least about 5% by weight of said substitute of a base, said base consisting essentially of:

from about 22 to 96.7% by weight of a relatively non-sweet, water soluble carbohydrate material having a D.E. of from about 10 to 70;

from about 3 to 70% by weight of fat in particle form, with a substantial portion of the fat particles having a diameter of no greater than about 3 microns; and from about 0.3 to 16% by weight of an emulsifier for maintaining said carbohydrate and fat in a stable dispersion when the base is dispersed in an aqueous medium, said base, when dispersed in said medium giving the base-medium dispersion a pH of from about 6.5 to 7.8, said carbohydrate, fat and emulsifier being selected for giving a plurality of said food particles stability such that:
  A. a 25% by volume thereof in water, when stored at 40° F. for 72 hours, exhibits no more than about 20% fat-water phase separation;
  B. a quantity of said particles sufficient to provide a total of about 0.36 grams of fat, when dispersed in 50 mls. of black coffee at 175° F., gives a relative reflectance of at least 50%, using an Agtron Model M-500A reflectometer standardized in the red spectral mode, 640 m.u., with a 00 calibration disc for zero and a 44 calibration disc for 100% relative reflectance;
  C. three grams of said food particles added to 150 mls. of 175° F. black coffee in a container having a 5 cm. diameter followed by gentle stirring and allowing the mixture to stand for two minutes, exhibits no more than about 10 oil droplets on the surface of the mixture; and
  D. taking the mixture derived from test C. hereof, and allowing the same to stand for an additional 3 minutes, the mixture exhibits essentially no precipitation or flocculation, and no more than a moderate amount of feathering.

2. The product as set forth in claim 1 wherein said emulsifier is selected from the group consisting of:
  (1) stearyl —n— lactylic acids, where n ranges from about 1 to 5, and the sodium, potassium and calcium salts thereof,
  (2) succinylated mono- and diglycerides of edible $C_{12}$–$C_{24}$ fatty acids, and the sodium and potassium salts thereof,
  (3) diacetyl tartaric acid esters of mono- and diglycerides of $C_{12}$–$C_{24}$ edible fatty acids, and the sodium and potassium salts thereof,
  (4) polyglycerol esters of $C_{12}$–$C_{24}$ edible fatty acids, ranging from 3 to 10 glycerol units and 1 to 10 fatty acids per molecule,
  (5) polyoxyethylene (20) sorbitan mono-, di- and triesters of $C_{12}$–$C_{24}$ edible fatty acids,
  (6) ethoxylated mono- and diglycerides of edible $C_{12}$–$C_{24}$ fatty acids,
  (7) stearyl monoglyceridyl citrate, and the sodium and potassium salts thereof,
  (8) citric acid esters of mono- and diglycerides of edible $C_{12}$–$C_{24}$ fatty acids, and the sodium and potassium salts thereof,
  (9) propylene glycol mono- and diesters of edible $C_{12}$–$C_{24}$ fatty acids,
  (10) glycerol mono- and diesters of edible $C_{12}$–$C_{24}$ fatty acids,
  (11) lactylated propylene glycol and glycerol mono- and diesters of edible $C_{12}$–$C_{24}$ fatty acids,
  (12) acetylated propylene glycol and glycerol mono- and diesters of edible $C_{12}$–$C_{24}$ fatty acids,
  (13) sorbitan monostearate,
  (14) lecithin,
  (15) sucrose esters of edible $C_{12}$–$C_{24}$ fatty acids,
  (16) phosphated mono- and diglycerides of edible $C_{12}$–$C_{24}$ fatty acids, and
  (17) mixtures thereof.

3. The product as set forth in claim 2 wherein said emulsifier is anionic and selected from the group consisting of sodium stearyl-2-lactylate, succinylated mono- and diglycerides of edible $C_{12}$–$C_{24}$ fatty acids and diacetyl tartaric acid esters of mono- and diglycerides of $C_{12}$–$C_{24}$ fatty acids in their acid or salt form, and mixtures thereof.

4. The product as set forth in claim 1 wherein a substantial portion of said fat particles have a diameter of no greater than about 1 micron.

5. The product as set forth in claim 1 wherein said fat is selected from the group consisting of cottonseed, soy, corn, peanut, safflower, sunflower, olive, rapeseed, coconut, palm kernel, palm, cocoa butter, sesame, sorghum, babassu, lard, tallow, butterfat, whale, herring, menhaden, pilchard, sardine, halibut, and synthetic mono, di and triglycerides and mixtures thereof.

6. The product as set forth in claim 1 wherein said carbohydrate material is starch-derived and is selected from the group consisting of corn syrup, wheat syrup, sorghum syrup, their malto-dextrins and mixtures thereof.

7. The product as set forth in claim 6 wherein said material is selected from the group consisting of corn syrups or malto-dextrins having a D.E. of from about 15 to 50.

8. The product as set forth in claim 1 including at least one optional agent for imparting desired organoleptic or nutritional properties to the product, said agent being selected from the group consisting of vitamins, minerals, flavoring agents, sweeteners, coloring agents, salts, pH adjustment agents, buffers, stabilizers, essential amino acids, anti-caking agents, anti-foaming agents and mixtures thereof.

9. The product as set forth in claim 1 wherein said product is a liquid synthetic milk and comprises from about 72 to 92% by weight water.

10. The product as set forth in claim 9 wherein said water level is from about 82 to 90% by weight.

11. The product as set forth in claim 9 wherein said base for said milk consists essentially of:
  from about 36 to 96.7% by weight of said carbohydrate material;
  from about 3 to 46% by weight of said fat; and
  from about 0.3 to 16% by weight of said emulsifier.

12. The product as set forth in claim 11 wherein:
  said carbohydrate material is present at a level of from about 54 to 84%;
  said fat is present at a level from about 13 to 39%; and
  said emulsifier is present at a level of from about 1.5 to 9%.

13. The product as set forth in claim 1 wherein said product is in a dilutable concentrate form and includes from about 35 to 70% by weight water.

14. The product as set forth in claim 1 wherein said product is a liquid cream substitute and comprises from about 50 to 90% by weight water.

15. The product as set forth in claim 14 wherein said water level is from about 65 to 80%.

16. The product as set forth in claim 14 wherein said base for said cream substitute consists essentially of:
  from about 22 to 87% by weight of said carbohydrate material;
  from about 12 to 70% by weight of said particulate fat particles; and
  from about 0.4 to 8% by weight of said emulsifier.

17. The product as set forth in claim 16 wherein:
  said carbohydate material is present at a level of from about 30 to 64%;
  said fat is present at a level of from about 28 to 60% with a substantial portion of the fat particles having a diameter of no greater than about 1 micron; and
  said emulsifier is present at a level of from about 1 to 4%.

18. The product as set forth in claim 1 is in dried form.

* * * * *